L. W. BOYNTON.
Thill-Coupling.
No. 27,755.  Patented Apr. 3. 1860.
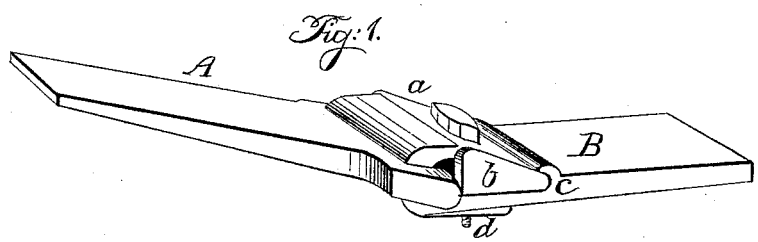
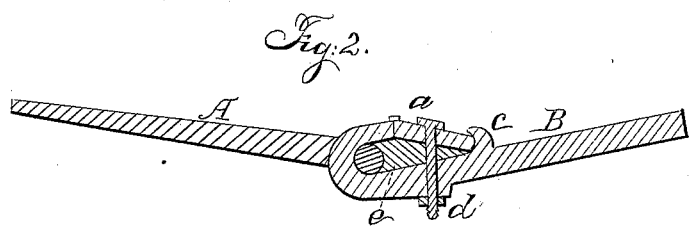
Witnesses.
P. C. Durham,
R. J. Fitzgerald,
Inventor.
L. W. Boynton

UNITED STATES PATENT OFFICE.

LEANDER W. BOYNTON, OF NEW YORK, N. Y., ASSIGNOR TO HIMSELF, AND DURHAM & BOOTH, OF NEW HAVEN, CONNECTICUT.

ATTACHING THILLS TO VEHICLES.

Specification of Letters Patent No. 27,755, dated April 3, 1860.

*To all whom it may concern:*

Be it known that I, LEANDER W. BOYNTON, of the city, county, and State of New York, have invented a new and useful Improvement in the Method of Attaching Thills to Carriages; and I do hereby declare that the following is a full, clear, and exact description of the construction, character, and operation of the same, reference being had to the accompanying drawing, which make part of this specification, in which—

Figure 1 is a perspective view of the shackle joint, showing its general appearance when in use. Fig. 2 is a longitudinal section of the same cut vertically through the center, showing the relative position of the several parts when in use.

My improvement consists in making the shackle, or its parts to be attached to the axletree, and to the thills, in the form of a flat hook and eye, fitting a piece of india rubber in the hook back of the eye, and a flanged plate, or box, over the rubber, which plate, or box, is to be secured by a screw-bolt passing through the plate and the hook so that by turning the nut further, at any time, the rubber will be more closely pressed against that portion of the eye which is within the hook, so as to keep it from rattling.

I make the hook part, B, of the shackle, of wrought iron, or any other suitable material, substantially, in the form shown in Fig. 1, and indicated in Fig. 2.

I make the flange plate, or box, a, of iron, or any other suitable material, substantially, in the form shown in Fig. 1, and indicated in Fig. 2, the flange of which serves to confine, or limit, the lateral expansion of the rubber, as indicated at b, Fig. 1. The rear end of this plate should be rounded and work in a concave space, as shown at c, so that it may be freely moved by the screw-bolt, d, to effect a suitable pressure on the block of rubber, e, to hold it steadily against the eye part of the shackle.

I make the eye part, A, of the shackle, of wrought iron, or any other suitable material, substantially, in the form shown in Fig. 1, and indicated in Fig. 2, so that it will be suitable to be attached to the thill in the usual way, or otherwise.

Having made the parts, I attach the hook, or part, B, to the axletree in the usual way, or otherwise, and attach the eye, or part, A, to the thill. I then pass the eye onto the hook, put in the piece, or block, of rubber, (as at e, Fig. 2,) put the flange plate, a, in its place, pass the screw-bolt through, and turn on the nut, (as at d,) when the shackle will appear as shown in Fig. 1.

The advantage of my improvement consists in that the rubber may be pressed against the part of the eye which is within the hook with the slightest degree of pressure that will prevent rattling, at any time, so as not to render the joint stiff when the rubber is cold, and so that it will not wear the rubber but very slowly, and yet so that the rubber may be pressed up firmly against the eye at any time by simply turning on the nut d, a little further. Thus the same piece of rubber may be varied, or re-pressed against the eye, (by simply turning the nut,) a great many times, so that the rubber will not wear away so fast, and yet, by varying it, by the nut, d, one piece will be equal in durability to a great number of pieces fitted in any other way. Thus it saves expense for rubber, saves almost all the trouble of fitting it, and render the pressure extremely equal at all times, as by a slight turn of the nut the pressure may be varied at pleasure.

I am aware that hooks and eyes have been in use for years, and for a great variety of purposes;—and that India rubber has been used, in several ways, for the purpose of preventing the rattling of the shackle, or joint, by which the thill are attached to the carriage,—but in all such cases the rubber has been passed around a screw-bolt, (or something analogous,) as secured in its place by being forced back until the screw-bolt can be inserted,—so that at the first it is made tighter than is necessary, which causes it to wear with considerable rapidity, and to become looser continually, as it wears, and therefore soon becomes too loose, so that it must be replaced by another piece,—thus rendering its use expensive, and irregular;—

I, therefore, do not claim either of these, as such, as my invention;—but—

What I claim as my invention, and desire to secure by Letters Patent, is—

The use of the hook and eye, in combination with the flanged plate and rubber, when the pressure of the rubber against the eye is regulated by means of the flanged plate, with its screw-bolt, and the whole is constructed, and made to operate, substantially, as herein described.

L. W. BOYNTON.

Witnesses:
P. C. Durham,
R. Fitzgerald.